(12) United States Patent
Thompson et al.

(10) Patent No.: US 9,262,148 B2
(45) Date of Patent: Feb. 16, 2016

(54) MODULAR ARCHITECTURE FOR DISTRIBUTED SYSTEM MANAGEMENT

(75) Inventors: Daniel Thompson, Duvall, WA (US); Mallikarjun Chadalapaka, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 498 days.

(21) Appl. No.: 13/229,896

(22) Filed: Sep. 12, 2011

(65) Prior Publication Data

US 2013/0067454 A1    Mar. 14, 2013

(51) Int. Cl.
*G06F 9/44* (2006.01)
*G06F 9/445* (2006.01)

(52) U.S. Cl.
CPC ........................................ *G06F 8/65* (2013.01)

(58) Field of Classification Search
CPC .............. G06F 8/61; G06F 8/71; G06F 9/44; G06F 9/455; G06F 9/466
USPC ......................................................... 717/173
See application file for complete search history.

(56) References Cited

U.S. PATENT DOCUMENTS

| | | | |
|---|---|---|---|
| 7,000,230 B1 | 2/2006 | Murray et al. | |
| 7,424,717 B2 | 9/2008 | Blevins | |
| 7,523,461 B2 | 4/2009 | Ghanaie-Sichanie et al. | |
| 7,890,646 B2 | 2/2011 | Khosravy et al. | |
| 8,555,273 B1 * | 10/2013 | Chia et al. | 717/173 |
| 2004/0148184 A1 | 7/2004 | Sadiq | |
| 2006/0015861 A1 * | 1/2006 | Takata et al. | 717/168 |
| 2007/0220242 A1 * | 9/2007 | Suzuki et al. | 713/1 |
| 2007/0220510 A1 * | 9/2007 | Bell et al. | 717/174 |
| 2007/0255854 A1 * | 11/2007 | Khosravy et al. | 709/248 |
| 2009/0300619 A1 * | 12/2009 | Hicks et al. | 718/100 |
| 2012/0239739 A1 * | 9/2012 | Manglik et al. | 709/203 |

OTHER PUBLICATIONS

Vogels, et al., "The Design and Architecture of the Microsoft Cluster Service", Retrieved at <<http://ieeexplore.ieee.org/stamp/stamp.jsp?tp=&arnumber=689494>>, Proceedings of the Twenty-Eighth Annual International Symposium on Fault-Tolerant Computing, Digest of Papers, Jun. 23-25, 1998, pp. 422-431.

(Continued)

*Primary Examiner* — Duy Khuong Nguyen
(74) *Attorney, Agent, or Firm* — Henry Gabryjelski; Kate Drakos; Micky Minhas

(57) ABSTRACT

A distributed system manager may identify updates to perform, identify devices to update, and perform the updates while maintaining service availability. The manager may consist of an orchestrator that uses a plug in architecture to interface with different update systems. The plugins may interface with an update system and respond to scan, download, and install commands from the orchestrator. The orchestrator may prepare each device within the distributed system for updating, then cause the updates to be performed via the plugins. In some embodiments, the logic for selecting devices to update and managing the workloads on the devices may be contained in a second type of plugin.

17 Claims, 3 Drawing Sheets

(56) References Cited

OTHER PUBLICATIONS

Chatley, et al., "Modelling a Framework for Plugins", Retrieved at <<http://www.google.co.in/url7sa=t&source=web&cd=5&ved=0CDgQFjAE&url=http%3A%2F%2Fciteseerx.ist.psu.edu%2Fviewdoc%2Fdownload%3Fdoi%3D10.1.1.10.7045%26rep%3Drep1%26type%3Dpdf&ei=dqEeTrz0K7CfmQWY4cS__Aw&usg=AFQjCNGnPPUlhqPk4PziWr9Un4GPvVEdxQ>>, Proceedings of the 9th European Software Engineering Conference and 11th ACM SIGSOFT Symposium on the Foundations of Software Engineering, Helsinki, Finland, Sep. 1-5, 2003.

Foster, et al., "Model Checking Service Compositions under Resource Constraints", Retrieved at <<http://www.google.co.in/url?sa=t&source=web&cd=1&ved=0CBcQFjAA&url=http%3A%2F%2Fciteseerx.ist.psu.edu%2Fviewdoc%2Fdownload%3Fdoi%3D10.1.1.103.5564%26rep%3Drep1%26type%3Dpdf&ei=haweTtiyMsn0mAW6hZCSAw&usg=AFQjCNEEho__rRtzbKiufY63KH2IZSfRnqQ>>, Proceedings of the the 6th joint meeting of the European software engineering conference and the ACM SIGSOFT symposium on The foundations of software engineering, Sep. 2007.

\* cited by examiner

MODULAR ARCHITECTURE FOR DISTRIBUTED SYSTEM MANAGEMENT

BACKGROUND

Managing distributed systems, such as computer clusters, can be a very difficult task, especially when updating the systems. In many distributed systems, services provided by the systems may be high uptime services that may be managed during an update so that the services are available from other devices.

SUMMARY

A distributed system manager may identify updates to perform, identify devices to update, and perform the updates while maintaining service availability. The manager may consist of an orchestrator that uses a plug in architecture to interface with different update systems. The plugins may interface with an update system and respond to scan, download, and install commands from the orchestrator. The orchestrator may prepare each device within the distributed system for updating, then cause the updates to be performed via the plugins. In some embodiments, the logic for selecting devices to update and managing the workloads on the devices may be contained in a second type of plugin.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
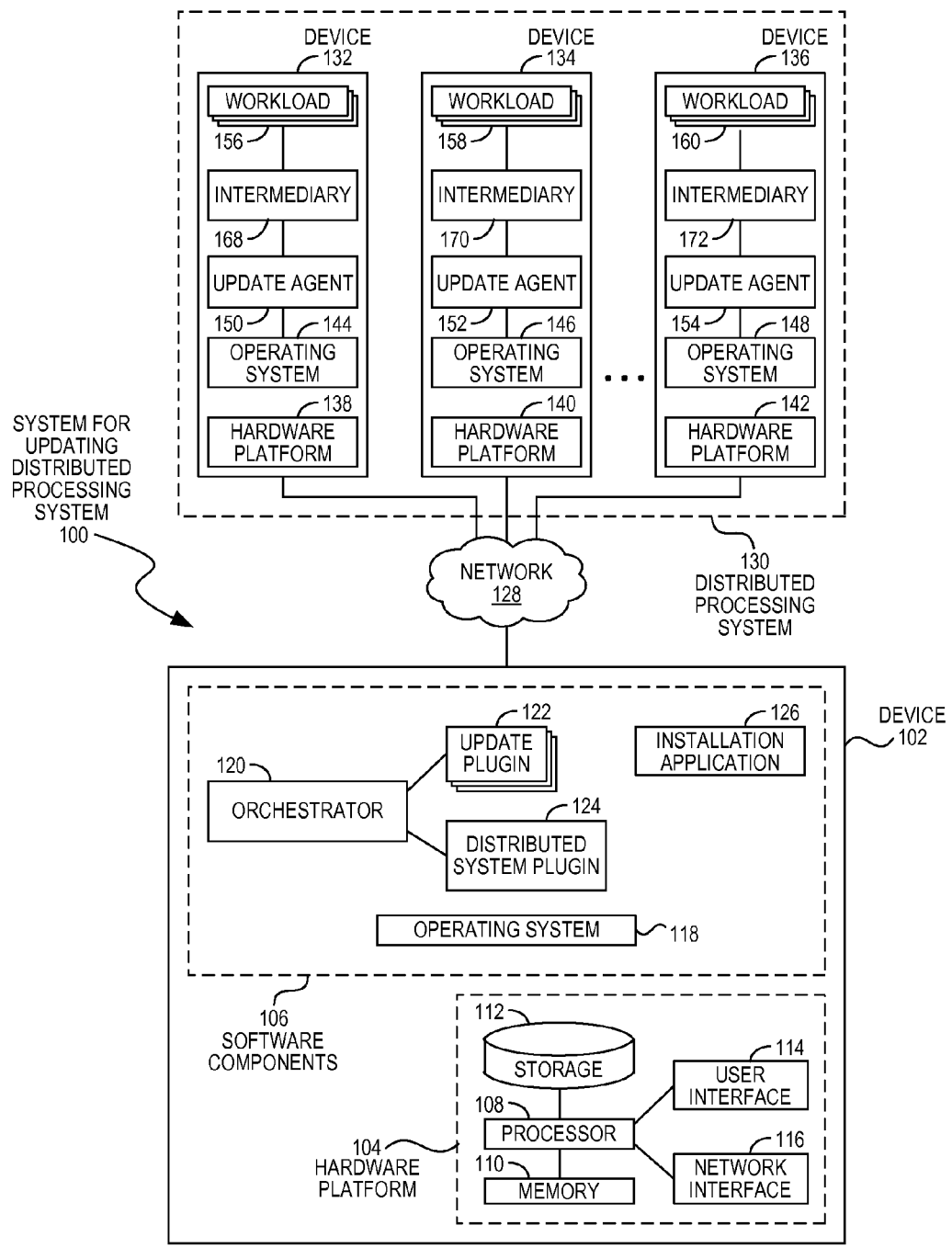
FIG. 1 is a diagram of an embodiment showing a network environment with an update orchestrator.

A distributed processing system may be updated using an orchestrator with plugins to communicate with update agents located on each of the devices in the distributed processing system. The plugin architecture may have a central orchestrator that may manage the overall workflow of the update process, along with plugins that customize or adapt the orchestrator to operate with specific software products on the devices to be updated, as well as plugins that configure the orchestrator to operate with different types of distributed systems.

The plugin architecture may allow the orchestrator to be configured to update new workloads, operating systems, distributed system types, or applications that may be installed on the various devices. A plugin may receive a standardized set of commands from the orchestrator, then interact with an update agent located on the device to be updated. The update agent may be the workload itself or a software component that operates between the plugin and the workload.

The orchestrator may also have a set of plugins that configure the orchestrator to operate with different types of distributed systems, such as clusters. The distributed system plugins may include mechanisms for communicating with the various devices, mechanisms for determining the service availability offered by the distributed system, as well as logic for managing the workloads on the devices and managing the updating sequence. The orchestrator may reconfigure the distributed system plugins when the distributed system is reconfigured or improved.

One example of a distributed system may be a cluster computing system. Many cluster computing systems operate instances of workloads on different devices so that a failure of any one of the devices in the cluster would not jeopardize the availability of the workload. A cluster computing system may be relatively tightly integrated and may have load balancing mechanisms, high speed networking between the devices, and a management system.

Another example of a distributed system may be a telecommunications routing system where routers may pass communications messages across a network. In many such systems, each router may operate autonomously, yet may be taken offline and have messages passed through other routers or nodes on the network.

In some cases, a distributed system may have workloads that operate largely decoupled or independently from other instances of the workload. For example, a distributed web server may have multiple instances of a web service operating on different devices. Each instance may service incoming requests for web pages, but may not interact with other instances of the workload. Such embodiments may be implemented in a loosely coupled distributed system. For example, the web servers may be located in different parts of a country or even the world, yet still operate in a distributed fashion.

In other cases, a distributed system may have workloads that pass messages between the instances on a frequent basis. For example, a distributed workload that processes finite element analysis or other large computational problems may pass messages between workloads on a very frequent basis. Such embodiments may be implemented in a tightly coupled distributed system, such as a cluster computing system, where the messages may be passed quickly between the devices on a high speed dedicated network.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100, showing an environment in which a distributed processing system may be updated using an orchestrator. Embodiment 100 is a simplified example of a network environment in which a distributed system may be managed at least in part using an orchestrator.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is a simplified example of a network environment with a distributed system. A device 102 may manage updates to the distributed processing system 130. The update process may identify updates to implement, prepare the devices for updating, and then perform the update and reconfigure the devices for normal operation.

Throughout this specification and claims, the term "target device" may be used as a shorthand notation to identify a device being updated or intending to be updated.

Updating a distributed system may be performed in a sequence of updates, so that the distributed system may continue to operate during the update. During the update sequence, one or more devices may be prepared for updating by moving any executing workloads to other devices, then performing the updates. During the updates, the device may be restarted one or more times. After the update has completed, the workloads may be moved back to the device, returning the device to normal service. The update process may then move on to the next device in the system.

Many distributed systems may be designed with duplicate devices and workloads so that various services may have a very high availability. When the workloads and devices are duplicated, the services may be available even when one of the devices may be taken offline due to an issue with hardware, software, network, or other issue. During an update, an orchestrator may prepare a device for updating by configuring the distributed system for the update. In a typical embodiment, the workloads on a target device may be moved or relocated to other devices.

Some distributed systems may be prepared for updating by coordinating an update with a load balancing system or other management systems. In such embodiments, an orchestrator may indicate to a load balancer that a particular device will be taken offline. The load balancer may then start shifting incoming requests to other devices until the workloads operating on the target device may be unutilized. At such a point, the device may be halted.

Many cluster computing systems may operate multiple workloads on the cluster. In some cases, the workloads may not be evenly distributed across the devices. As a simple example, a cluster of sixteen devices may have an email service operating on four of the devices, a file system service operating on eight of the devices, an accounting application operating on two of the devices, and a web service operating on all of the devices. In such an example, each device may have a different set of workloads than the other devices.

The update may be performed in a sequence that defines which devices may be updated and in what order. Some devices may have workloads that may be affected by an update, while other devices may not be affected by a particular update.

The update sequence may take into account the particular nature of the distributed system. Some distributed systems may have a small number of devices with a limited amount of redundancy. Such systems may be updated one device at a time. Other distributed systems may have a large number of devices with a large amount of redundancy, and two or more devices may be updated at a time.

The workloads on the devices may affect the update sequence. For example, a device with a workload that may be duplicated on only one other device may be updated alone, while two or more devices with a widely duplicated workload may be updated in parallel.

The anticipated usage of a device may be a factor in scheduling an update. For example, some workloads may be highly used during normal business hours, but lightly used during the evenings and nights. Other workloads may be highly used during a weekend sporting event, for example, but rarely used at other times. In such examples, a scheduling system may start a sequence during a period of low usage and pause or stop a sequence during a period of high usage.

The plugin architecture may allow the system to be easily updated and expanded, even by third parties. A common orchestrator may use plugins to define how to interact with various software components that may be updated. In some cases, the plugin may communicate with an update agent operating on the target device. In other cases, the plugin may communicate with the application or other software component on the device that will be updated.

In order to use the system to manage updates compatible to a certain software updating tool, a plugin for that software updating tool may be installed to the orchestrator. The plugin may receive three basic commands from the orchestrator: scan, download, and install.

The scan command may determine if an update is available or applicable to the target device. In some cases, the scan command may include an identifier for a specific update to determine if the update has already been performed.

The download command may cause an installation package to be downloaded to the target device or made available to the target device for updating. The download command may cause the target device to prepare for the installation without actually performing the installation. In a typical use scenario, installation packages may be downloaded and prepared prior to giving the command to install the update. This may minimize the downtime of the update installation process by preparing for it ahead of time while the device is still operating normally.

The install command may cause the update to be installed. In some cases, the installation process may cause the target device to be restarted or rebooted one or more times. When the install command has completed, the plugin may return a success code or error code to the orchestrator.

The orchestrator may interact with the distributed processing system using input from a distributed processing plugin. The distributed processing plugin may include data collection routines that identify the devices being managed, determine the mechanisms for communicating to the devices, ensure availability of services offered by the distributed processing system, and includes the logic for determining a sequence of devices to update and how to prepare devices for updating.

The distributed processing plugin may include communications mechanisms that are tailored to a particular type of distributed processing system. The communication mechanisms may include an interface into a management console or other systems that may be used to configure and operate the devices in the system. In cases where a management system is not present, the distributed processing plugin may manage each operation with the target devices. When a management system is present, the distributed processing plugin may communicate with the management system and cause the management system to perform some or all of the various operations.

The distributed processing plugin may also include logic for determining a sequence of updates and how to prepare the devices for updating. The logic for determining a sequence may evaluate the workloads, physical characteristics, or other features of the various devices and determine a sequence and schedule for updating. Such logic may be different for each type of distributed system.

Some distributed processing plugins may define how a device may be prepared for updating. The preparation may move workloads from the target device to other devices in the distributed processing system in a manner that maintains the workload availability. After performing an update, the plugins may cause the workloads to be returned to the target device prior to moving to another target device.

The system of embodiment 100 is illustrated as being contained in a single system 102. The system 102 may have a hardware platform 104 and software components 106.

The system 102 may represent a server or other powerful, dedicated computer system that may support multiple user sessions. In some embodiments, however, the system 102 may be any type of computing device, such as a personal computer, game console, cellular telephone, netbook computer, or other computing device.

The hardware platform 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware platform 104 may include user interface devices 114. The user interface devices 114 may include keyboards, monitors, pointing devices, and other user interface components.

The hardware platform 104 may also include a network interface 116. The network interface 116 may include hardwired and wireless interfaces through which the system 102 may communicate with other devices.

Many embodiments may implement the various software components using a hardware platform that is a cloud fabric. A cloud hardware fabric may execute software on multiple devices using various virtualization techniques. The cloud fabric may include hardware and software components that may operate multiple instances of an application or process in parallel. Such embodiments may have scalable throughput by implementing multiple parallel processes.

The software components 106 may include an operating system 118 on which various applications may execute. In some cloud based embodiments, the notion of an operating system 118 may or may not be exposed to an application.

An orchestrator 120 may manage the overall workflow for updating the devices of the distributed processing system 130. The orchestrator 120 may identify updates to install, query the various devices to determine whether or not the update may apply to each device, determine a sequence for updating, and cause the update to be performed.

The orchestrator 120 may have update plugins 122 that communicate with the target devices. The update plugins 122 may communicate with a software, firmware, hardware, or other component that may be updated. In some cases, the update plugins 122 may communicate with an update agent on the target device, and the update agent may communicate with the component to be updated. Some embodiments may use an intermediary that communicates with the update plugins 122 and the update agents on the cluster devices.

Some embodiments may include an installation application 126. The installation application 126 may configure the system to update a new component on the various target devices. The installation application 126 may install an update plugin 122 and update agents on the various target devices. The installation application 126 may then configure the plugins and update agents to communicate with each other.

The device 102 is illustrated as being connected to a network 128 that contains the distributed processing system 130. In some embodiments, the device 102 may be a management device or other device that controls the overall operation of the distributed processing system 130. In some embodiments, the device 102 may be one of the devices within the distributed processing system 130 and the orchestrator 120 may be merely one workload within the distributed processing system 130.

The distributed processing system 130 may have multiple devices 132, 134, and 136. The number of devices in a system may range from two to thousands of devices. A typical cluster computing system may have between four and sixteen devices, but other types of distributed processing systems may have many thousands of devices.

Each device 132, 134, and 136 may have a hardware platform 138, 140, and 142, respectively. The hardware platforms may include a processor and other components, such as the hardware platform 104.

Each device 132, 134, and 136 may have an operating system 144, 146, and 148, and each operating system may have an update agent 150, 152, and 154. The update agents for the operating systems may perform various installation and configuration processes for the operating systems.

Similarly, each device 132, 134, and 136 may have a set of workloads 156, 158, and 160. Each device may also have an intermediary 168, 170, and 172.

The update agents may interface with any component on the devices that may be updated. For example, update agents may manage the updating of operating systems, applications, services, workloads, and other software component. Some update agents may update firmware, BIOS, or other hardware or firmware components.

When a new component is to be managed by the orchestrator 120, update agents for the component may be installed on the target devices and a corresponding plugin 122 on the orchestrator 120. This architecture allows third parties to create their own plugins for newly deployed workloads and add the workloads to the management of the orchestrator 120.

The intermediaries may be components that interface between the orchestrator plugins and the update agents. The intermediaries may gather information for reporting to the orchestrator 120, as well as store reports. Some embodiments may use the intermediaries to collect status of the various update agents and report the status to the orchestrator 120. The status may include availability of the update agent, success or failure of update agent activities, status of the update agent operations, and other information. In some cases, the intermediaries may gather information from sources other than the update agents, such as the operating system, various services, or other sources.

The intermediaries may store reports for later reference. In some embodiments, the intermediaries may store reports based on information collected from update agents on the same device. In some embodiments, the orchestrator 120 may collect information from each of the various intermediaries, create a cluster report based on all of the input, and transmit the cluster report to the intermediaries. The intermediaries may store the cluster report for reference from any of the devices.

The intermediaries may receive and respond to commands from the orchestrator 120 or from update plugins 122. The update plugins 122 may transmit commands to the intermediaries, which may in turn pass the commands to the various update agents. Such embodiments may allow the intermediaries to monitor and report the operations of the update agents.

Figure 2:
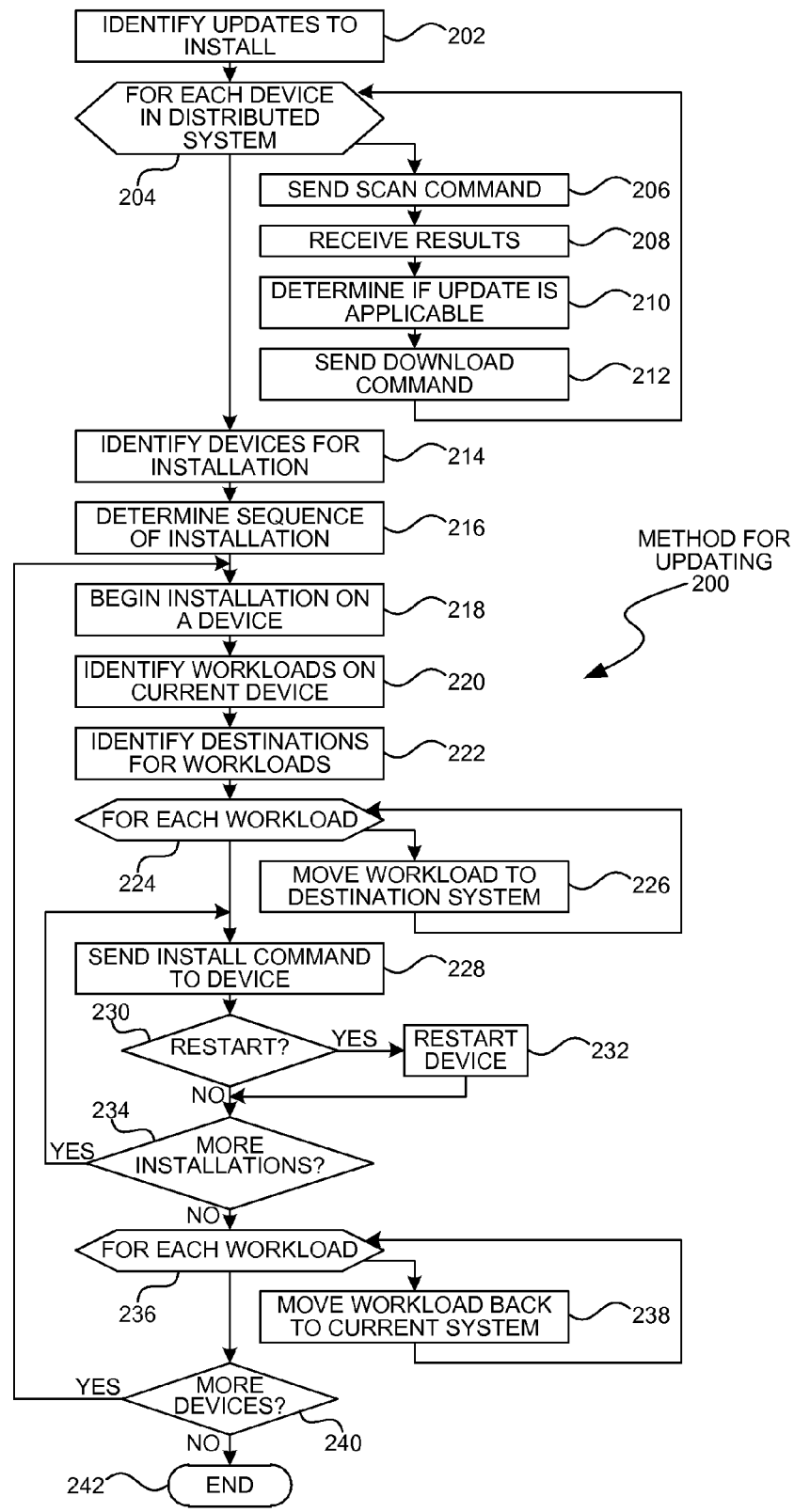
FIG. 2 is a flowchart diagram of an embodiment showing a method for updating a distributed processing system.

FIG. 2 is a flowchart illustration of an embodiment 200 showing a method for updating a distributed processing system. Embodiment 200 is a simplified example of a method that may be performed by an orchestrator, such as the orchestrator 120 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates an example method for performing an update on a distributed processing system. Embodiment 200 performs several steps in preparation, including scanning the devices to determine whether an upgrade is appropriate, downloading the installation packages to the devices, and then actually performing the update.

When performing the update, embodiment 200 may clear the device from any operating workloads, and then cause the updates to be installed. After installation, the workloads may be moved back to the target device. The process may be performed repeatedly for each device in the system.

In block 202, updates may be identified for installation. In some embodiments, an orchestrator may have a list of components that may be updateable. The orchestrator may determine when an update is available by contacting the manufacturer of the component in some fashion. In some cases, the orchestrator may periodically request updates from the manufacturers in a pull arrangement. In other cases, the orchestrator may receive updates from the manufacturers in a subscription or push arrangement.

For each device in the distributed system in block 204, a scan command may be sent to the device in block 206. The scan command may be sent through each update plugin that may be installed in the orchestrator. In such a case, the scan command may be transmitted through multiple plugins to different update agents located on the device.

Each update agent may interpret the scan command to determine whether or not an update is appropriate. In some embodiments, the scan command may return a result in block 208 that includes a current version for the monitored component. In such embodiments, the orchestrator may compare the current version to an update version to determine whether or not the update is appropriate. In other embodiments, the update version may be transmitted to the update agents and the update agents may determine whether or not the update is appropriate.

In block 210, the update may be evaluated to determine if the update is appropriate. When the update is appropriate, a download command may be sent to the update agent in block 212. The download command may cause the update agent to download an installation package in preparation for installation.

Based on the response from the scan command, the devices that will receive an update may be identified in block 218.

The sequence of installation may be defined in block 220. The sequence may identify which devices are updated in which order, as well as a schedule for the update. In some embodiments, the anticipated loads, workload distribution, and other factors may be used to determine an installation schedule and sequence.

The installation of a device may begin in block 218.

The workloads on the current device may be identified in block 220. Destinations for the workloads may be identified in block 222. The destinations may be other devices within the distributed processing system that may be capable of handling the target device's workloads during the installation.

For each workload in block 224, the workload may be moved to the destination system in block 226. After processing all of the workloads in block 224, the device may be free from workloads.

In some embodiments, the workloads may be physically transferred to other devices. In an example of a virtual machine workload, the virtual machine may be paused and copied to another device, then restarted. In an example of a workload that may be managed using a load balancing system, the load balancer may be configured to send requests for the workload to other systems. In such an example, the workload may be operating on the target device, but may not be processing requests.

The operations of blocks 224 and 226 may prepare the device for installation in a proactive manner. The preparation may involve organizing the cluster or other distributed processing system so that the target device can go offline while maintaining availability for various services. In many embodiments, a distributed processing system may be able to tolerate a system to be removed from service immediately with no preparation. Some such embodiments may not prepare the device for updates by relocating workloads and may merely take the device offline without preparation.

Embodiments where the device is prepared for updates in a proactive manner may redistribute and balance workloads across other devices within the distributed processing system. Such embodiments may maintain a higher availability or suffer fewer disruptions than embodiments where such proactive measures are not performed.

Once the device is prepared for updating, an install command may be issued in block 228. The install command may cause a software component on the target device to perform the installation. In some cases, an update may cause the device to restart in block 230, in which case a restart may be performed in block 232.

In some cases, multiple updates may be installed. The updates may affect a single updatable component on the target device or different updatable components. When multiple updatable components are updated, different plugins for the orchestrator and different update agents on the target device may be invoked. For example, a device may be have an update performed on a BIOS firmware device, then a second update on an operating system, followed by a third update to an application. When multiple installations are to be performed in block 234, the process may return to block 228 to install another update.

After each update has completed, the target device may be returned to service by bringing workloads back to the device. Each of the workloads previously moved from the target device may be processed in block 236, where the workload may be moved back to the device in block 238.

The target device may be back in normal operation after processing the workloads in block 236.

If there are more devices in the update sequence in block 240, the process may return to block 218 to process the next target device. When all of the devices are processed in block 240, the update process may end in block 242.

Figure 3:
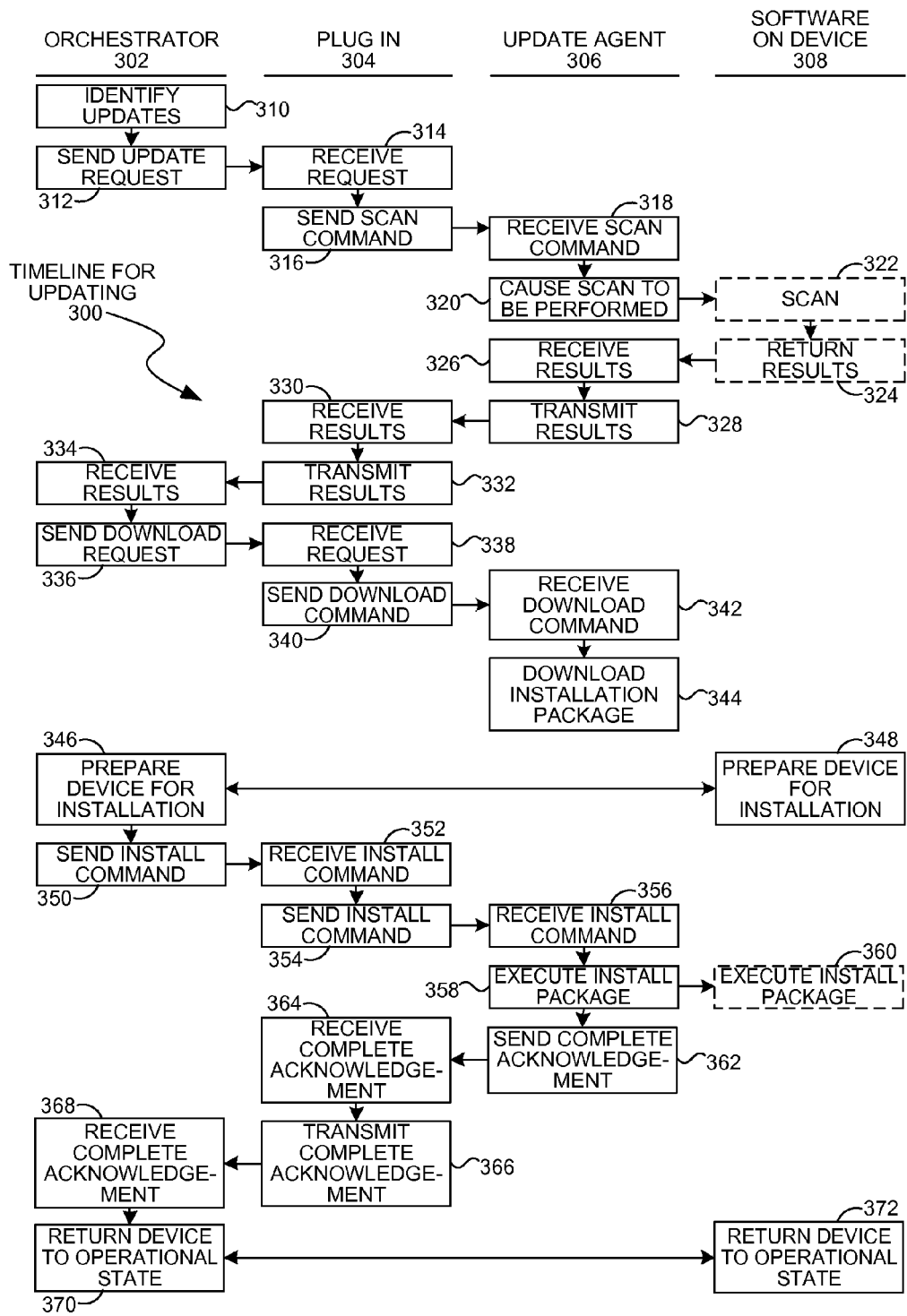
FIG. 3 is a timeline diagram of an embodiment showing the interactions of various components when updating one device of a distributed processing system.

FIG. 3 is a timeline illustration of an embodiment 300 showing a method for updating a distributed processing system. Embodiment 300 is a simplified example of a method that may be performed by an orchestrator 302 shown in the left hand column, a plugin 304 shown in the second column, an update agent 306 shown in the third column, and software 310 on the target device shown in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates the interactions between the various components of a system such as that illustrated in embodiment 100. The operations of the components illustrate an architecture where the orchestrator communicates with a plugin, which in turn communicates with an update agent operating on the target device. The update agent may perform many of the functions for updating the software.

Other embodiments may combine the update agent and the software, or other combinations may also be possible.

The orchestrator 302 may identify updates in block 310 and send an update request to the plugin in block 304. In some embodiments, the update request may be in the form of a scan command.

The plugin in block 314 may receive the request and issue a scan command in block 316 to the update agent 306, which may receive the scan command in block 318.

In response to the scan command, the update agent 306 may cause the scan to be performed in block 320. In some cases, the update agent 306 may scan the software 308 or cause the software 308 to perform a scan in block 322.

The scan may determine whether an update is available and appropriate for the target device. In some embodiments, the scan may be performed by the update agent 306 or software 308 by comparing the current version of the software 308 to a desired version. The comparison may be performed by the update agent 306 or software 308. In such an embodiment, the results may be returned in blocks 324 or 326 may contain the results of the comparison.

In other embodiments, the scan may determine a version of the software 308 and merely return the version. In such embodiments, the orchestrator 302 or plugin 304 may perform a comparison to determine whether an update is available and appropriate.

The update agent 306 may transmit results in block 328 from the scan, and the results may be received in block 330 by the plugin 304. The plugin 304 may transmit the results in block 332 to the orchestrator 302, which may receive the results in block 334.

After processing the scan results, the orchestrator 302 may send a download request in block 336. The download request may be in the form of a download command. The request may be received by the plugin 304 in block 338, which may forward the download command in block 340 to the update agent 306. The update agent 306 may receive the download command in block 342 and cause the installation package to be downloaded in block 344.

When the orchestrator 302 is ready to update the target device, the orchestrator 302 and the software 308 may place the device in condition for installation in blocks 346 and 348. Each embodiment may have different mechanisms for preparing the device for updates.

In block 350, the orchestrator 302 may send an install command, which may be received in block 352 by the plugin 304. The plugin 304 may send the install command in block 354 to the update agent 306, which may receive the install command in block 356.

The update agent 306 may execute an install package in block 358. The install package may be the same install package that was downloaded in block 344. In some cases, the software 308 may execute the install package in block 360.

In some cases, the install package may cause the target device to be restarted one or more times.

Once the installation is complete, the update agent 306 may send a complete acknowledgement in block 362 to the plugin 304, which may receive the acknowledgement in block 364. The plugin 304 may transmit the complete acknowledgement in block 366, and the complete acknowledgement may be received in block 368 by the orchestrator 302.

The complete acknowledgement of block 362 may indicate success or failure of the installation. In some instances, a failed installation may be acknowledged, and the orchestrator 302 may log the failure for an administrator to view and rectify. the orchestrator 302 may be configured to continue processing after a failed installation in some instances and may be configured to stop further installations after a failed installation. Such decision points may be configured for each specific installation package, for types of installation packages, or for other situations and options.

After processing the installations, the orchestrator 302 may cause the device to return to its operational state in blocks 370 and 372.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
an orchestrator operable on a first device, said first device having a first processor, said orchestrator configured to manage a distributed system software update process to a plurality of devices using a plurality of plugins;
a plurality of a type of plugin, each of the type of plugin configured to:
customize a scan command from the orchestrator to a corresponding software agent at the device, the software agent configured to determine if it is appropriate to update software previously installed on the device; and
relay an indication from the software agent to the orchestrator, the indication indicating that it is appropriate to update software previously installed on the device;
customize an install command from the orchestrator to a corresponding software agent to instruct said corresponding software agent to install a software update at said device, said install command customized to include communication mechanisms tailored to said device; and
relay an installation message from the software agent to said orchestrator, the installation message indicating the status of installing the software update at said device;
wherein the plurality of the type of plugin comprises:
a first plugin tailored to communicate with a first subset of one or more devices from among said plurality of devices; and
a second plugin tailored communicate with a second different subset of one or more devices from among said plurality of devices.

2. The system of claim 1, wherein said orchestrator being configured to manage a distributed system software update process comprises said orchestrator being configured install software updates in an update sequence, comprising:
causing a first software update to be installed using said first plugin;
determining that said first software update is successful; and
subsequently causing a second software update to be installed using said second plugin in response to said determination.

3. The system of claim 2, said second software update being performed after said first software update is successful.

4. The system of claim 3, wherein said first plugin is configured to communicate with an operating system update agent.

5. The system of claim 4, wherein said second plugin is configured to communicate with a firmware update agent.

6. The system of claim 1, wherein said orchestrator being configured to manage a distributed system software update process, comprises said orchestrator being configured to:
identify active workloads on a device;
move said active workloads to another device; and
when there no active workloads on said device, causing said software updates to be installed.

7. The system of claim 6, further comprising said orchestrator being configured to:
determine that said software updates are installed; and
move said active workloads from other device to said device.

8. The system of claim 1, said distributed system comprising a computer cluster.

9. A method performed by a computer device for managing a workflow of a distributed system software update process, said method comprising:
an orchestrator identifying a plurality of devices in a distributed system that are to have software updated, including for each of the plurality of devices:
sending a scan command from a type of plugin to a corresponding software agent at the device, the software agent configured to determine if it is appropriate to update software previously installed on the device; and
receiving at said type of plugin an indication that it is appropriate to update software previously installed on the device, the indication sent from the software agent;
said orchestrator causing said previously installed software to be updated, including installing a software update at each device in the plurality of devices by:
sending an install command from said type of plugin to a corresponding software agent at said device to instruct said corresponding software agent to install said software update at said device, said plugin configured to customize said install command to operate with said device, said install command including using communication mechanisms tailored to said device; and
receiving at said type of plugin an installation message indicating the status of installing the software update at said device, the installation message received from said update agent;
wherein said type of plugin comprises:
a first plugin tailored to communicate with a first subset of one or more devices from among said plurality of devices; and
a second plugin tailored communicate with a second different subset of one or more devices from among said plurality of devices.

10. The method of claim 9, wherein said orchestrator causing said previously installed software to be updated comprises said orchestrator:
causing a first software update to be installed using said first plugin; determining that said first software update is successful; and subsequently causing a second software update to be installed using said second plugin in response to said determination.

11. The method of claim 9, wherein said orchestrator causing said previously installed software to be updated comprises said orchestrator causing said previously installed software to be updated according to an update sequence.

12. The method of claim 9, wherein said orchestrator causing said previously installed software to be updated comprises said orchestrator:
identifying active workloads on said device;
moving said active workloads to another device; and
when there no active workloads on said device, causing said software update to be installed.

13. The method of claim 12, wherein said orchestrator causing said previously installed software to be updated comprises said orchestrator:
determining that said software updates are installed; and
moving said active workloads from said other device back to said device.

14. A computer program product for use at a computer system, the computer program product for implementing a method for managing a workflow of a distributed system software update process, said computer program product comprising computer memory having stored thereon computer-executable instructions that, when executed at processor, cause the computer system to perform the method, including the following:
identify a plurality of devices in a distributed system that are to have software updated, including for each of the plurality of devices:
send a scan command from a type of plugin to a corresponding software agent at the device, the software agent configured to determine if it is appropriate to update software previously installed on the device; and
receive at said type of plugin an indication that it is appropriate to update software previously installed on the device, the indication sent from the software agent;
update said previously installed software, including installing a software update at each device in the plurality of devices by:
send an install command from said type of plugin to a corresponding software agent at said device to instruct said corresponding software agent to install said software update at said device, said plugin configured to customize said install command to operate with said device, said install command including using communication mechanisms tailored to said device; and
receive at said type of plugin an installation message indicating the status of installing the software update at said device, the installation message received from said update agent;
wherein said type of plugin comprises:
a first plugin tailored to communicate with a first subset of one or more devices from among said plurality of devices; and
a second plugin tailored communicate with a second different subset of one or more devices from among said plurality of devices.

15. The computer program product of claim 14, wherein computer-executable instructions that, when executed, cause said computer system to update said previously installed software comprises computer-executable instructions that, when executed, cause said computer system to:
install a first software update using said first plugin; determining that said first software update is successful; and
subsequently install a second software update using said second plugin in response to said determination.

16. The computer program product of claim 14, wherein computer-executable instructions that, when executed, cause said computer system to update said previously installed software comprises computer-executable instructions that, when executed, cause said computer system to update said previously installed software according to an update sequence.

17. The computer program product of claim 14, wherein computer-executable instructions that, when executed, cause said computer system to update said previously installed software comprises computer-executable instructions that, when executed, cause said computer system to:
identify active workloads on said device;
move said active workloads to another device; a
when there no active workloads on said device, install said software update;
determine that said software updates are installed; and
move said active workloads from said other device back to said device.

* * * * *